(12) United States Patent
Yeh

(10) Patent No.: US 7,176,400 B1
(45) Date of Patent: Feb. 13, 2007

(54) OUTDOOR LAMP WITH A HIDDEN SWITCH

(76) Inventor: Peter Yeh, No. 10, Lane 808, Chungshan Rd., Hsinhua Chen, Tainan Hsien (TW)

( * ) Notice: Subject to any disclaimer, the term of this patent is extended or adjusted under 35 U.S.C. 154(b) by 0 days.

(21) Appl. No.: 11/503,842

(22) Filed: Aug. 14, 2006

(51) Int. Cl.
*H01H 13/00* (2006.01)

(52) U.S. Cl. ..................................... 200/339; 200/553

(58) Field of Classification Search ............... 200/553, 200/529, 566, 339, 332, 337, 302.3; 362/258, 362/282, 322–323
See application file for complete search history.

(56) References Cited

U.S. PATENT DOCUMENTS

| | | | | |
|---|---|---|---|---|
| 5,219,070 A | * | 6/1993 | Grunert et al. | 200/330 |
| 5,319,996 A | * | 6/1994 | Harris | 74/560 |
| 5,343,187 A | * | 8/1994 | Shiao | 338/70 |
| 5,386,354 A | * | 1/1995 | Osteen | 362/258 |
| 5,662,213 A | * | 9/1997 | Kattler et al. | 200/302.3 |
| 6,420,669 B1 | * | 7/2002 | Shenker et al. | 200/339 |
| 6,743,997 B2 | * | 6/2004 | Schmidt et al. | 200/553 |

* cited by examiner

*Primary Examiner*—K. Lee
(74) *Attorney, Agent, or Firm*—William E. Pelton, Esq.; Cooper & Dunham LLP

(57) ABSTRACT

An outdoor lamp with a hidden switch has a housing, a lamp, a switch and a control lever. The housing has a circumferential wall having a lever slot and a lever bracket formed inside the housing. The lamp is mounted inside the housing. The switch is mounted inside the housing, is connected electrically to the lamp and has a control member. The control lever is mounted pivotally on the lever bracket and has a proximal end extending to and abutting the control member of the switch and a distal end extending out of the lever slot to be wiggled by a user to switch on/off the lamp. The switch is hidden inside the housing to be protected from being wetted by rainwater and to avoid rust or a short circuit problem.

6 Claims, 6 Drawing Sheets

OUTDOOR LAMP WITH A HIDDEN SWITCH

BACKGROUND OF THE INVENTION

1. Field of the Invention

The present invention relates to an outdoor lamp, and more particularly to an outdoor lamp with a hidden switch that is less likely to be drenched by rainwater.

2. Description of Related Art

Outdoor lamps are extensively used to light up a dark outdoor environment. For example, most trucks are equipped with the outdoor lamp to provide an illuminative environment to help workers load or unload cargoes.

With reference to FIG. 7, a conventional outdoor lamp in accordance with the prior art comprises a housing (60), a lamp and a switch (61). The housing (60) has a circumferential wall and a mounting slot defined through the circumferential wall of the housing (60). The lamp is mounted inside the housing (60). The switch (61) is mounted in the mounting slot in the circumferential wall of the housing (60) and is connected electrically to the lamp to switch on/off the lamp.

However, the switch (61) of the conventional outdoor lamp is exposed outside the housing (60). In a rainy day, the switch (61) is easily wetted and drenched by rainwater, which may cause rust or a short circuit problem to cause the switch being damaged.

Therefore, the invention provides an outdoor lamp with a hidden switch to mitigate and obviate the aforementioned problems.

SUMMARY OF THE INVENTION

The primary objective of the present invention is to provide an outdoor lamp with a hidden switch that is mounted inside a housing of the outdoor lamp to protect the switch from rainwater.

The outdoor lamp with a hidden switch in accordance with the present invention comprises a housing, a lamp, a switch and a control lever. The housing has a circumferential wall, a switch seat and a lever bracket. The circumferential wall has an inner surface, a bottom and a lever slot formed through the bottom of the circumferential wall. The switch seat is formed on and protrudes from the inner surface of the circumferential wall and has a switch slot aligning with the lever slot. The lever bracket is formed between the lever slot and the switch slot.

The lamp is mounted inside the housing and is connected electrically to an external power source. The switch is mounted on the switch seat inside the housing, is connected electrically to the lamp and has a control member facing and extending to the switch slot in the switch seat to switch on/off the lamp. The control lever is mounted pivotally on the lever bracket inside the housing and has a proximal end extending to and abutting the control member of the switch and a distal end extending out of the lever slot.

The switch is mounted and hidden inside the housing so that rainwater is unlikely to wet the switch. The distal end of the control lever extends out of the housing to allow a user to pull or push the control lever conveniently.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
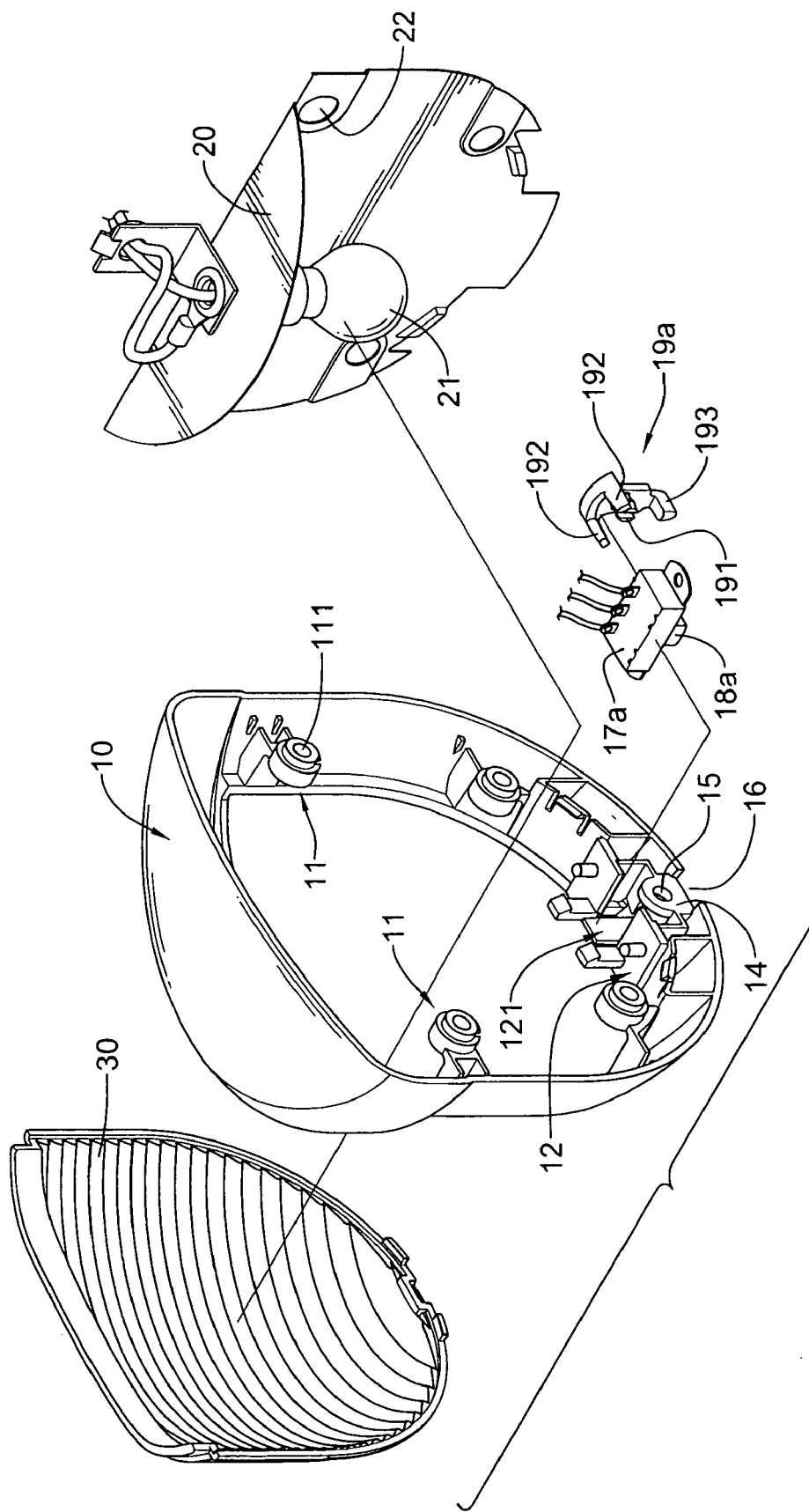
FIG. 1 is an exploded perspective view of a first embodiment of an outdoor lamp with a hidden switch in accordance with the present invention.

With reference to FIGS. 1 to 6, an outdoor lamp with a hidden switch in accordance with the present invention comprises a housing (10), a lamp (21), a switch (17a, 17b) and a control lever (19a, 19b).

The housing (10) has a front opening, a rear opening, a circumferential wall, a switch seat (12), a lever bracket (14), multiple connecting members (11), a cover (30) and a rear panel (20). The circumferential wall of the housing (10) has an inner surface, a bottom and a lever slot (16). The lever slot (16) is formed through the bottom of the circumferential wall of the housing (10).

The switch seat (12) is formed on and protrudes from the inner surface of the circumferential wall of the housing (10) and has a switch slot (121). The switch slot (121) is formed through the switch seat (12) and aligns with the lever slot (16) in the bottom of the circumferential wall of the housing (10). The lever bracket (14) is formed between the lever slot (16) and the switch slot (121) and has a pivot hole (15). The pivot hole (15) is formed transversely through the lever bracket (14).

The connecting members (11) are formed on and protrude from the inner surface of the circumferential wall of the housing (10) and each of the connecting members (11) has a distal end and a connecting tube (111). The connecting tube (111) is formed at the distal end of the connecting member (11).

The cover (30) is transparent and corresponds to and is mounted in the front opening of the housing (10) to allow lights inside the housing (10) to pass through. The rear panel (20) is mounted in the rear opening of the housing (10) and has multiple mounting holes (22). The mounting holes (22) are formed through the rear panel (20) and respectively correspond to and are mounted on the connecting tubes (111) of the connecting members (11).

The lamp (21) is mounted inside the housing (10) is connected to an external power source for emitting lights to provide an illuminating effect in dark and may be mounted on the rear panel (20).

The switch (17a, 17b) is mounted on the switch seat (12) inside the housing (10) to be protected from being wetted by rainwater to avoid causing rust or a short circuit problem. The switch (17a, 17b) is connected electrically to the lamp (21), has a control member (18a, 18b) and may be a slide switch or a lever switch. The control member (18a, 18b) of the switch (17a, 17b) faces and extends to the switch slot (121) in the switch seat (17a, 17b) to switch on/off the lamp (21) and may be a slide bar or a lever button.

Figure 2:
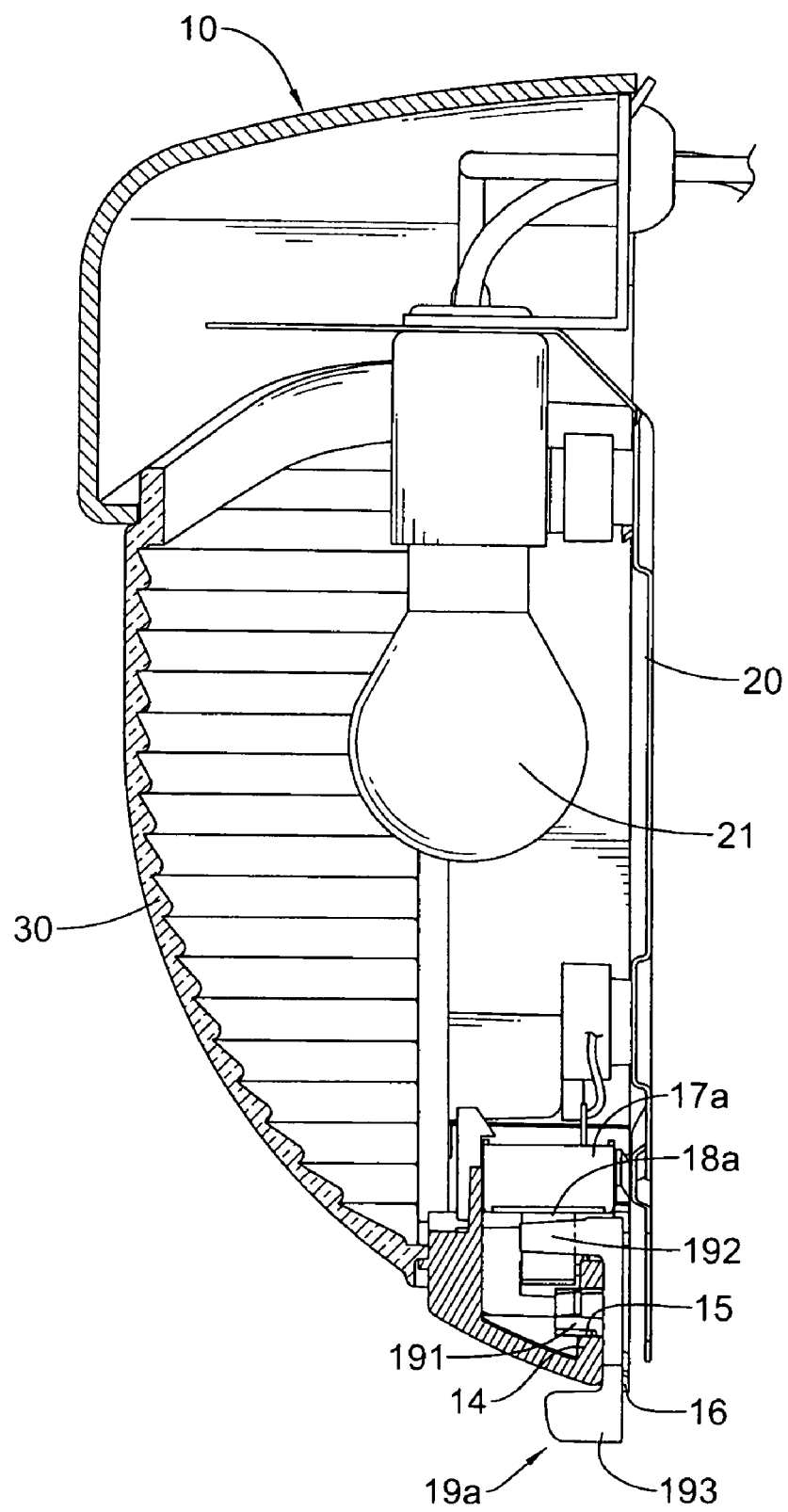
FIG. 2 is a side view in partial section of the outdoor lamp in FIG. 1.
Figure 3:
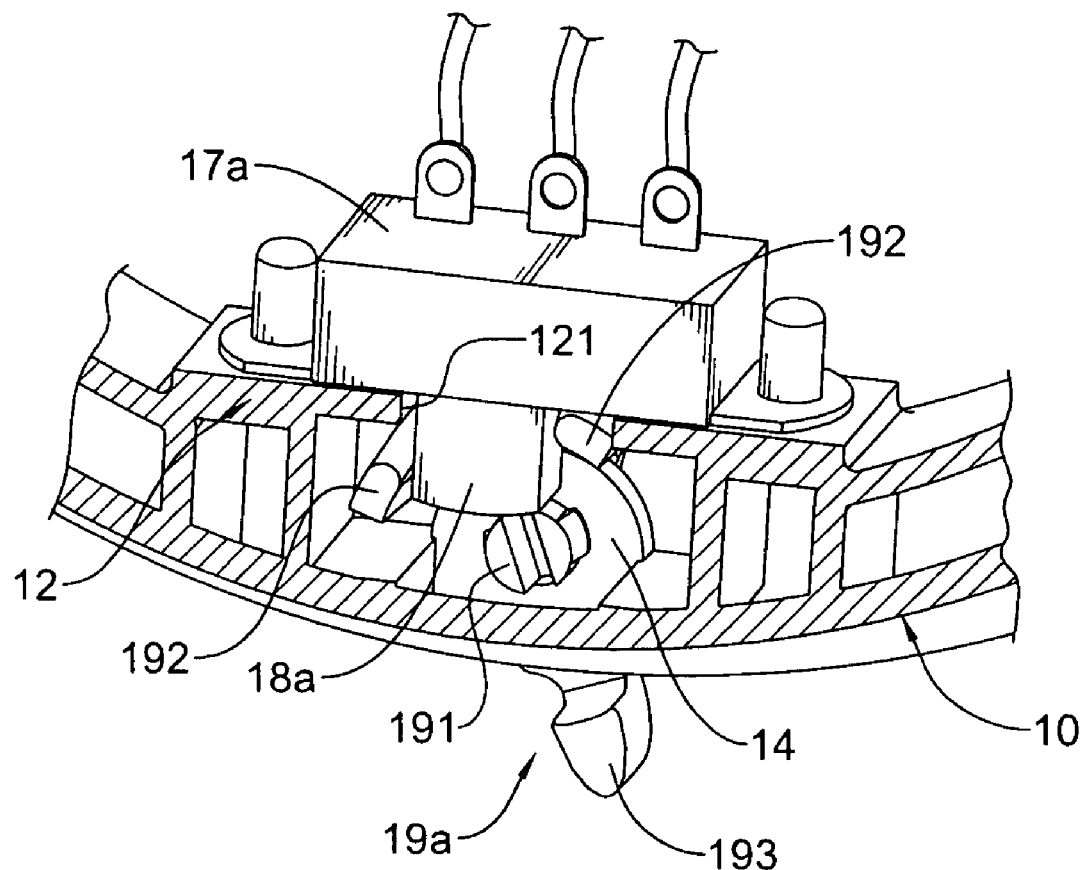
FIG. 3 is an enlarged perspective view in partial section of the outdoor lamp in FIG. 1.

With further reference to FIGS. 1–3, in a first embodiment of the switch (17a), the switch (17a) is a slide switch and the control member (18a) of the switch (17a) is a slide bar and has two sides. The slide bar is slid to switch on/off the lamp (21).

Figure 4:
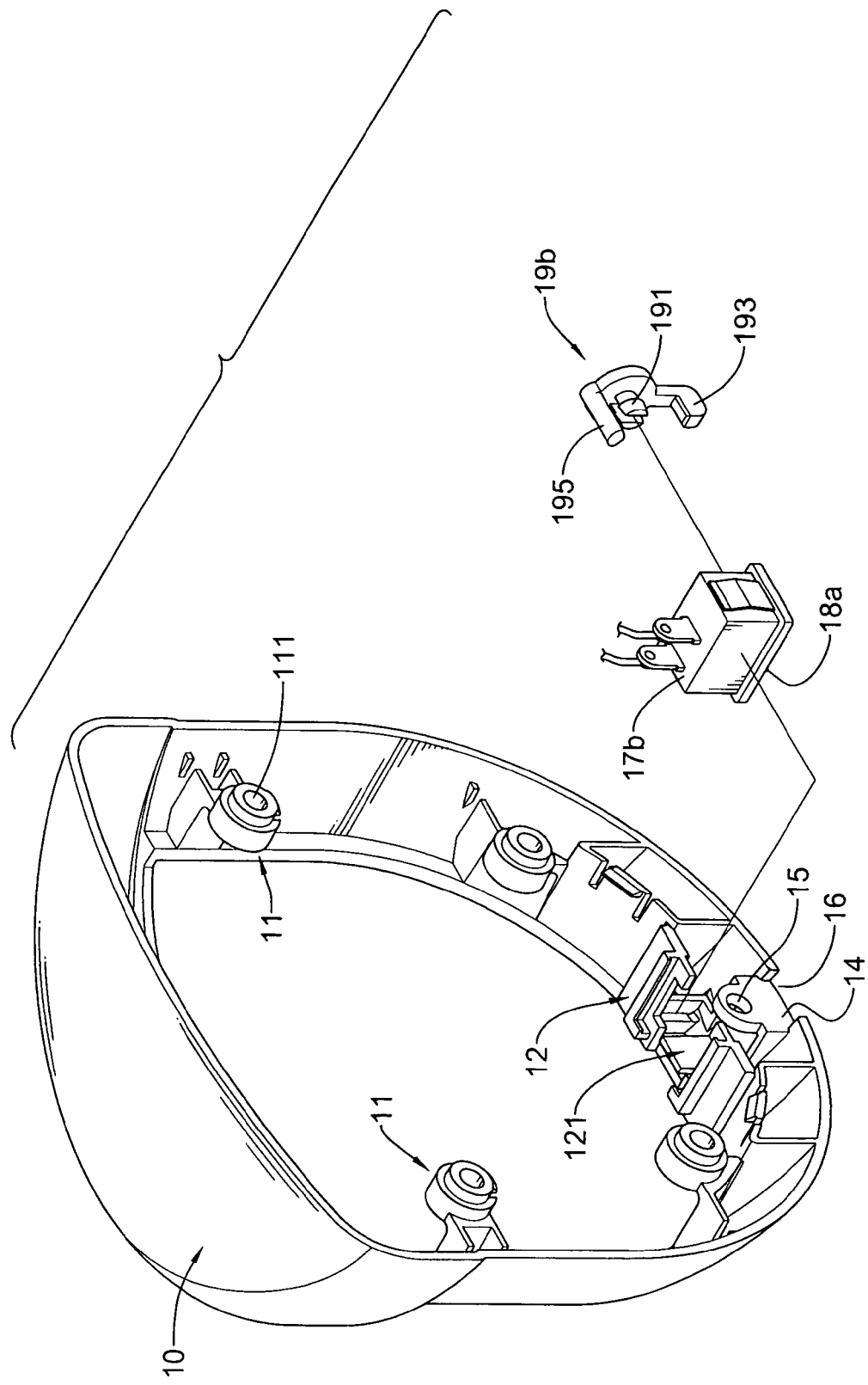
FIG. 4 is an exploded perspective view of a second embodiment of the outdoor lamp with a hidden switch in accordance with the present invention.
Figure 5:
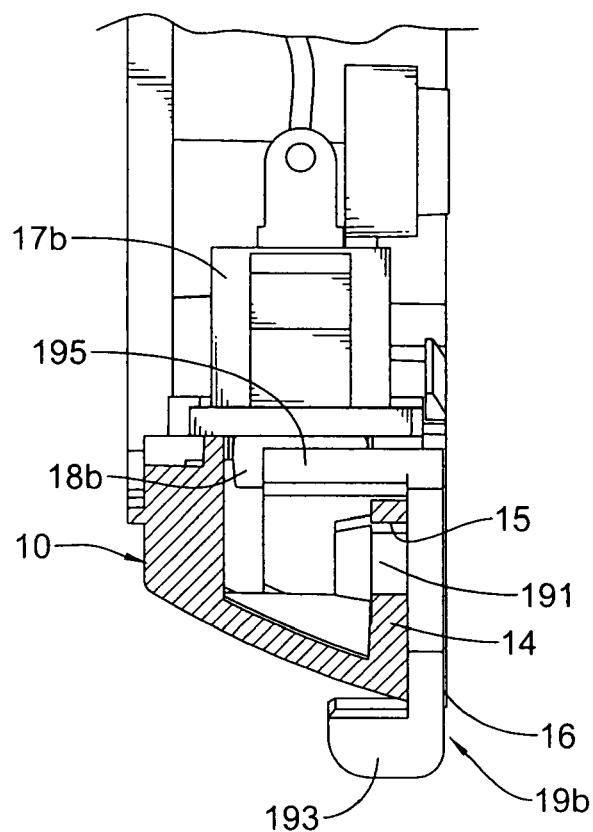
FIG. 5 is a side view in partial section of the outdoor lamp in FIG. 4.
Figure 6:
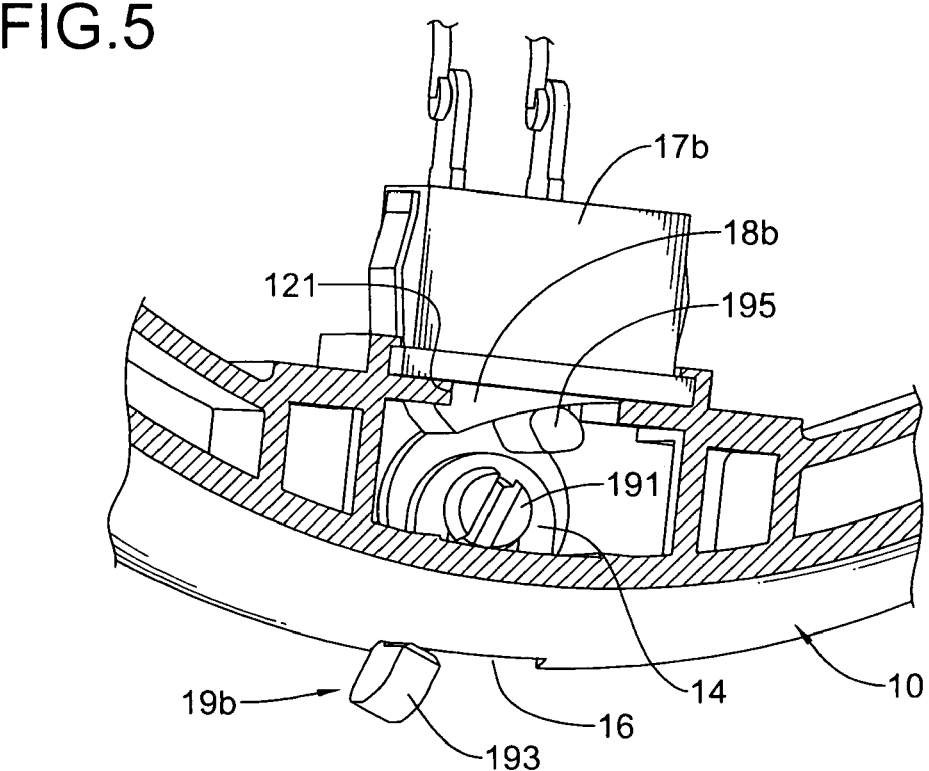
FIG. 6 is an enlarged perspective view in partial section of the outdoor lamp in FIG. 4.
Figure 7:
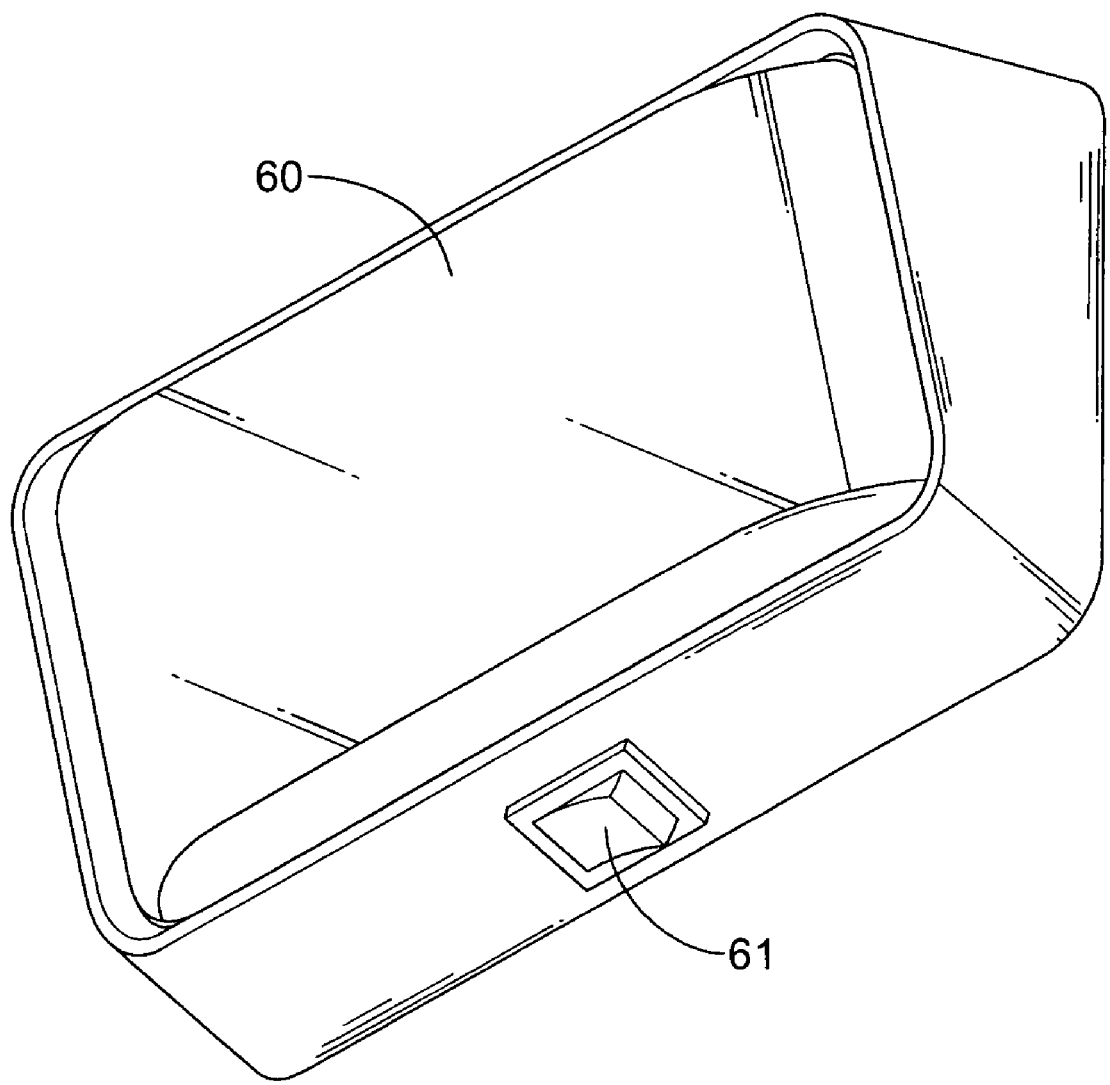
FIG. 7 is a perspective view of a conventional outdoor lamp in accordance with the prior art.

With further reference to FIGS. 4–6, in a second embodiment of the switch (17b), the switch (17b) is a lever switch and the control member (18b) of the switch (17b) is a lever button and has a bottom. The lever button is turned to switch on/off the lamp (21).

The control lever (19a, 19b) is mounted pivotally on the lever bracket (14) inside the housing (10) and has a proximal end, a distal end (193) and a pivot rod (191). The proximal end of the control lever (19a, 19b) extends to and abuts the control member (18a, 18b) of the switch (17a, 17b) to slide or turn the control member (18a, 18b) and may be implemented in several ways.

With further reference to FIGS. 1–3, the proximal end of the control lever (19a) has two arms (192). The arms (192) are formed at and extend transversely from the proximal end of the control lever (19a) and hold the two sides of the control member (18a) of the switch (17a) to slide the control member (18a) when the control lever (19a) is pivoted.

With further reference to FIGS. 4–6, the proximal end of the control lever (19b) has an arm (195). The arm (195) is formed at and extends transversely from the proximal end of the control lever (19b) and abuts the bottom of the control member (18b) of the switch (18b) to turn the control member (18b) when the control lever (19b) is pivoted.

The distal end (193) of the control lever (19a, 19b) extends out of the lever slot (16) in the bottom of the circumferential wall of the housing (10) so that a user can hold the distal end (193) of the control lever (19a, 19b) to pivot the control lever (19a, 19b) to switch on/off the lamp (21).

The pivot rod (191) is formed on and protrudes transversely from the control lever (19a, 19b), is mounted rotatably in the pivot hole (15) in the lever bracket (14) to pivotally mount the control lever (19a, 19b) on the lever bracket (14).

The present invention mainly achieve the following advantages:

The switch (17a, 17b) is hidden inside the housing (10) to be protected from being wetted by rainwater and to avoid causing rust or a short circuit problem. Because the distal end (193) of the control lever (19a, 19b) extends out of the housing (10), the user can hold the distal end (193) of the control lever (19a, 19b) to pivot the control lever (19a, 19b) to switch on/off the lamp (21) conveniently.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An outdoor lamp comprising
   a housing having
      a circumferential wall having
         an inner surface;
      a bottom; and
      a lever slot formed through the bottom of the circumferential wall of the housing;
      a switch seat formed on and protruding from the inner surface of the circumferential wall of the housing and having
         a switch slot formed through the switch seat and aligning with the lever slot; and
      a lever bracket formed between the lever slot in the bottom of the circumferential wall of the housing and the switch slot in the switch seat;
   a lamp mounted inside the housing;
   a switch mounted on the switch seat inside the housing, electrically connected to the lamp and having
      a control member facing and extending to the switch slot in the switch seat to switch on/off the lamp; and
   a control lever mounted pivotally on the lever bracket inside the housing and having
      a proximal end extending to and abutting the control member of the switch; and
      a distal end extending out of the lever slot.

2. The outdoor lamp as claimed in claim 1, wherein
   the switch is a slide switch;
   the control member of the switch is a slide bar and has two sides; and
   the proximal end of the control lever has
      two arms formed at and extending transversely from the proximal end of the control lever and holding the two sides of the control member of the switch.

3. The outdoor lamp as claimed in claim 1, wherein
   the switch is a lever switch;
   the control member of the switch is a lever button and has a bottom; and
   the proximal end of the control lever has
      an arm formed at and extending transversely from the proximal end of the control lever and abutting the bottom of the control member of the switch.

4. The outdoor lamp as claimed in claim 1, wherein
   the lever bracket further has a pivot hole formed transversely through the lever bracket; and
   the control lever further has a pivot rod formed on and protruding transversely from the control lever and mounted rotatably in the pivot hole in the lever bracket.

5. The outdoor lamp as claimed in claim 1, wherein
   the housing further has
      a front opening;
      a rear opening;
      a cover being transparent and corresponding to and mounted in the front opening of the housing; and
      a rear panel mounted in the rear opening of the housing; and
   the lamp is mounted on the rear panel.

6. The outdoor lamp as claimed in claim 5, wherein
   the housing further has
      multiple connecting members formed on and protruding from the inner surface of the circumferential wall of the housing and each having
         a distal end; and
         a connecting tube formed at the distal end of the connecting member; and
   the rear panel further has multiple mounting holes formed through the rear panel and respectively corresponding to and mounted on the connecting tubes of the connecting members.

* * * * *